US005980175A

United States Patent [19]

Zimmerman

[11] Patent Number: 5,980,175

[45] Date of Patent: Nov. 9, 1999

[54] ADAPTER FOR MOUNTING A COAXIAL COUPLER WITHIN AN OPENING FORMED IN A PLANAR-SURFACED STRUCTURE

[76] Inventor: Dean C. Zimmerman, 29 Churchill Pl., Big Flats, N.Y. 14814

[21] Appl. No.: 09/121,727

[22] Filed: Jul. 24, 1998

[51] Int. Cl.[6] .............................. F16B 19/00; F16B 37/04

[52] U.S. Cl. .............................. 411/108; 411/112; 411/182; 411/509; 285/46

[58] Field of Search .............................. 411/34, 36, 38, 411/112, 113, 182, 338, 339, 508, 509, 108; 285/46, 196, 338, 140.1

[56] References Cited

U.S. PATENT DOCUMENTS

| | | | |
|---|---|---|---|
| 3,534,797 | 10/1970 | Reinhard et al. | 411/182 X |
| 4,295,766 | 10/1981 | Shaw | 411/113 |
| 4,473,244 | 9/1984 | Hill | 285/46 X |
| 5,051,636 | 9/1991 | Ishimoto et al. | 411/34 X |
| 5,253,962 | 10/1993 | Close, Jr. | 411/34 |
| 5,340,257 | 8/1994 | Morassutti | 411/182 X |

*Primary Examiner*—Neill Wilson
*Attorney, Agent, or Firm*—Bernard J. Murphy

[57] ABSTRACT

A body, plastic molded, comprises a plate with an integral, extending hub, having a throughgoing bore in which to nest a coaxial coupler. The hub has an outer periphery which is uniformly fluted, for holding the hub fast to the inner surface of a hub-receiving hole formed in a wall, floor, or ceiling of a structure, while the plate unobtrusively interfaces the planar surface of the structure. Consequently, a coaxial coupler can be emplaced, securely, without need for a supporting junction box, vertical stud, or any such prop, anywhere in a wall, floor or ceiling.

10 Claims, 2 Drawing Sheets

FIG. 1
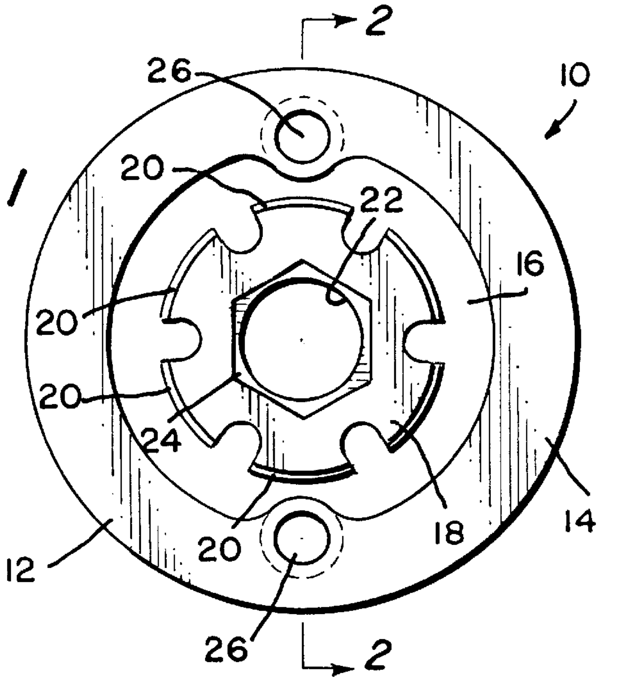
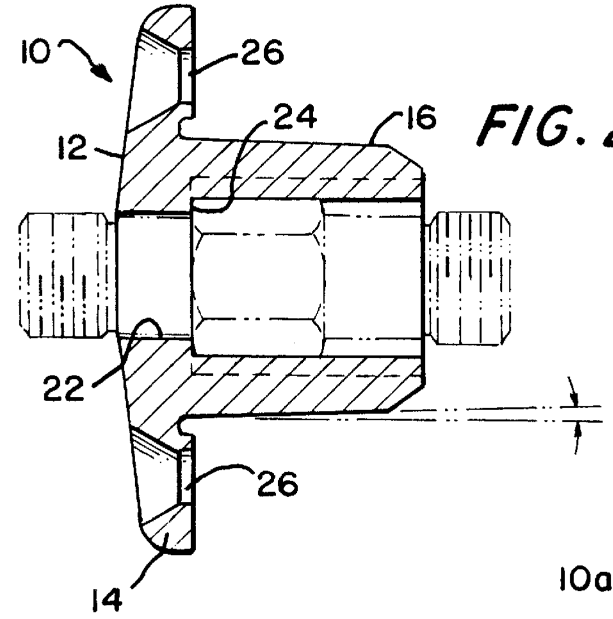
FIG. 2
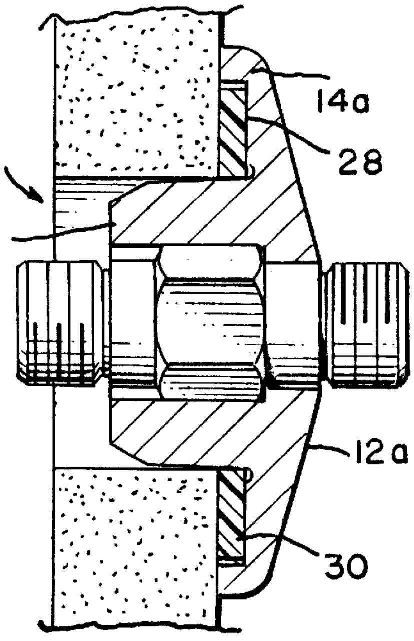
FIG. 3

ADAPTER FOR MOUNTING A COAXIAL COUPLER WITHIN AN OPENING FORMED IN A PLANAR-SURFACED STRUCTURE

This invention pertains to mounting adapters, and in particular to a novel adapter especially configured for mounting a coaxial coupler within an opening formed in a planar-surfaced structure, such as a floor, wall, counter or desk top, or the like.

Commonly, the installation of coaxial couplers and associated wires and cables, in existing buildings, or buildings under construction, results in a clutter of wires and cables, external of the walls, floors and ceilings, which can be a serious safety hazard. Particularly is this so where the wiring and cabling is simply passed through a bare hole formed in a wall, or floor, the hole formed therein to accommodate a coaxial coupler. Alternatively, and more safe, is the practice of employing a standard electrical box, with a blank cover and a center hole, for mounting the coaxial coupler in a structure, i.e. a wall or the like. Such boxes, however, are ungainly and unsightly and, in fact, there is no need for anything larger than approximately two inches in diameter, and comprising a substantially flat disc or plate, with an extending, through-hole housing in which to nest the coaxial coupler. The disc or plate can interface the planar surface of the structure through which the coaxial coupler is to penetrate, setting thereagainst with a shallow, unobtrusive profile. The need, then, is for a simple adapter for mounting a coaxial coupler within an opening formed in a planar-surfaced structure, the adapter being of one piece, small, and readily emplaced, wherever, in the structure. Such an adapter should need no junction box, stud or beam for its support in the structure; it should be susceptible of emplacement in the structure wherever one chooses to have it, without regard to supporting studs, electrical boxes or junction boxes.

It is an object of this invention, therefore, to meet the aforesaid need, by setting forth just such a simple, one-piece, small and facilely used and emplaced adapter.

Particularly, it is an object of this invention to disclose an adapter, for mounting a coaxial coupler within an opening formed in a planar-surfaced structure, comprising a body; said body having a plate for interfacingly engaging a planar surface; and said body further having a hub (a) integral with, and (b) extending perpendicularly from, said plate, for insertion into an opening formed in a planar-surfaced structure; wherein said body has a throughgoing bore formed therein in which to nest a coaxial coupler; and said hub has means formed thereon for holding said hub fast to an inner surface of such an opening in a planar-surfaced structure.

Further objects of this invention, as well as the novel features thereof, will become apparent by reference to the following description, taken in conjunction with the accompanying figures, in which:

FIG. 1 is a vertical illustration of the novel adapter, according to an embodiment thereof, showing the rear or structure-entering portion of the adapter;

FIG. 2 is a cross-sectional view, taken along section 2—2 of FIG. 1, with a phantomed depiction of a coaxial coupler shown nested within the adapter;

Figure 4:
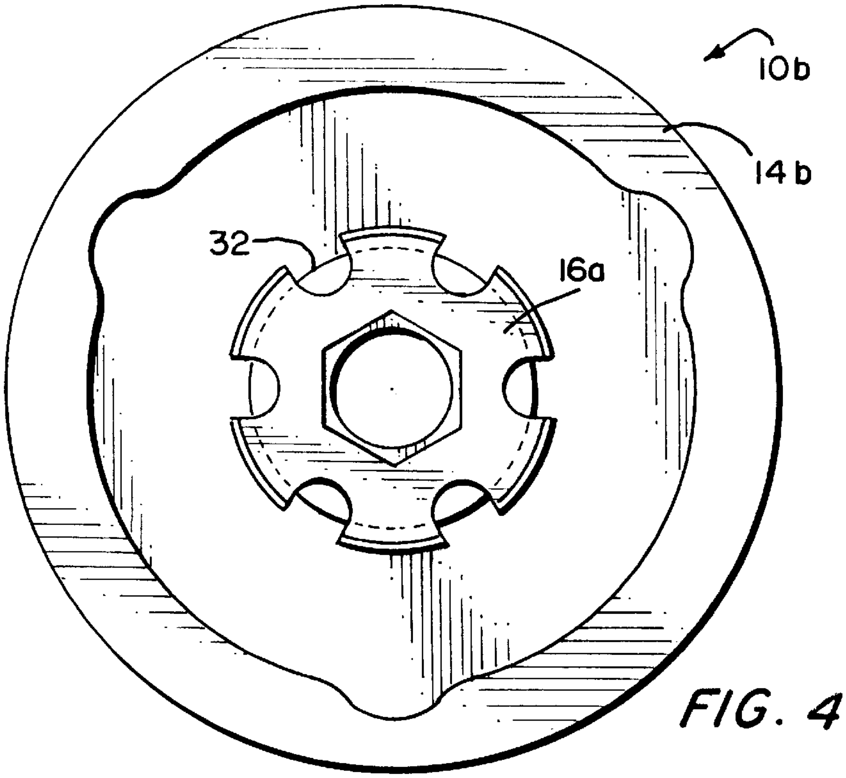
Figure 5:
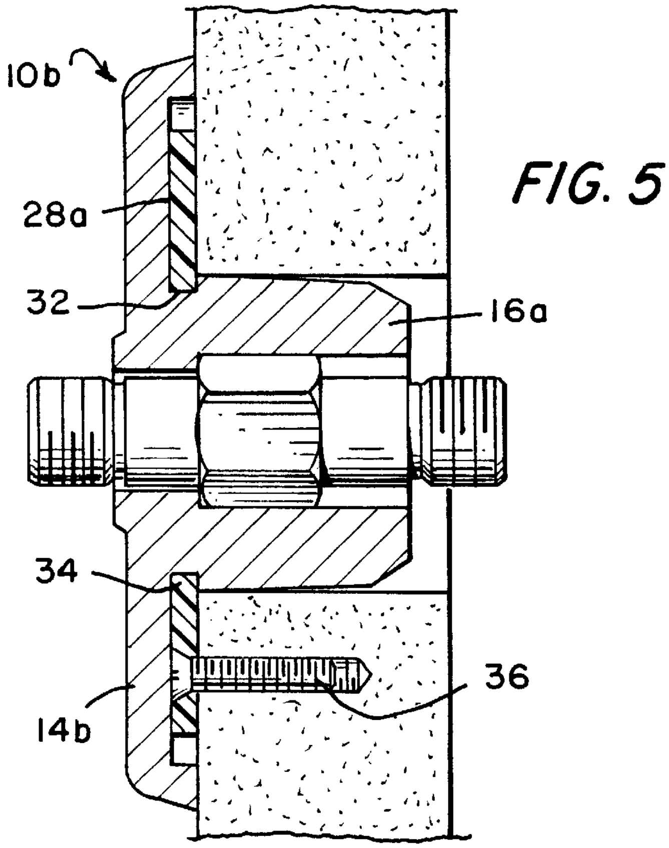

FIG. 3 is a view, similar to that of FIG. 2, of an alternative embodiment of the adapter; again, this illustration shows a coaxial coupler positioned in the adapter, albeit, now, in full-line illustration; and FIGS. 4 and 5 illustrate a further, alternative embodiment of the novel adapter. FIG. 4 corresponds, generally, to the illustration in FIG. 1, and FIG. 5 is similar to the view shown in FIG. 3.

As shown in FIGS. 1 and 2, the novel adapter 10, according to an embodiment thereof, comprises a body 12 having a plate 14 and an integral hub 16. The plate 14 is provided for effecting an interfacing engagement thereof with the planar surface of a structure in which the adapter 10 is desired to be emplaced. The hub 16 is especially dimensioned to enter an opening, provided therefor in such an aforesaid structure, with an interference fit. As shown in FIG. 2, the hub 16 has a shallow taper (a) to facilitate its mold-formed release, and (b) to ease its entry into the opening which has been provided therefor. Also, as shown in FIG. 1, the hub 16 has a periphery 18 which is uniformly fluted. The fluting of the hub periphery 18 defines a plurality of discrete, curved lands 20, and it is the lands 20 which are pressed into the inner surface of a structural opening for holding the hub 16 fast to the inner surface. The grooves of the fluting are, in cross-section, reentrant; i.e., they are greater than semicircular. The body 12 has a throughgoing bore 22 formed therein in which to nest a coaxial coupler, and such a coaxial coupler is shown in phantom in FIG. 2. The portion of the bore 22 which subsists in the plate 14 is round, whereas the portion of the bore 22 which subsists in the hub 16 is hexagonal. The body 12 has a shoulder 24 formed therein, between the aforesaid two portions of the bore 22, for setting a hexagonal configuration of the coupler thereagainst.

If needed, to aid in securing the hub 16 in such structural opening as is provided therefor, in addition to the interference fitting of the lands 20, the plate 14 has a pair of holes 26 formed therein for accommodating fasteners. Screws set through the holes 26 will make the plate flush with the outer, planar surface of the structure, rendering the adapter 10 unobtrusive, and will resist displacement of the hub 16 from its receiving opening.

In an alternative embodiment of the invention, the adapter 10*a*, as shown in FIG. 3, has a plate 14*a* in which there are no hardware-accommodating holes. On the contrary, the plate 14*a* is impervious, but it has an annular recess 28 formed in the structure-interfacing side thereof. Recess 28 is provided to receive an adhesive agent 30 therein. Preferably, a double-coated, vinyl-foam tape, adhesive disc is pressed into the recess 28, and then the body 12*a* is inserted into the hub opening therefor. This will cause the disc 30 to adhere to the interfacing surface of the subject structure, and hold the plate 14*a* secure thereagainst without need for plate-penetrating hardware. This arrangement is found most suitable for the circumstance in which the subject structure is sheet rock, or such.

FIGS. 4 and 5 depict still a further, alternative embodiment of the invention. Here, the adapter 10*b* has a plate 14*b* with another annular recess 28*a* in the rear, or structure-interfacing side thereof, and the recess extends, inwardly, into a shallow groove 32 which subsists at the commencement of the hub 16*a*. This embodiment of the invention comprises a thermoplastic washer 34 which is fastened, via a plurality of screws 36 (only one of which is shown), to the structure, circumjacent the hub-provided opening. In this arrangement, then, the hub 16*a* is entered into the opening, and forceably through the yieldable washer 34. Upon the groove 32 reaching the washer 34, the innermost portion of the washer 34 snaps into the groove 32, securing the adapter 10*b* against displacement from the structure.

While I have described my invention in connection with specific embodiments thereof, it is to be clearly understood that this is done only by way of example, and not as a limitation to the scope of the invention, as set forth in the objects thereof and in the appended claims.

I claim:

1. An adapter, for mounting a coaxial coupler within an opening formed in a planar-surfaced structure, comprising:

a body;

said body having a plate for interfacingly engaging a planar surface; and said body further having a hub (a) integral with, and (b) extending perpendicularly from, said plate, for insertion thereof into an opening formed in a planar-surfaced structure; wherein said body has a throughgoing bore formed therein in which to nest a coaxial coupler;

said hub has means formed thereon for holding said hub fast to an inner surface of such an opening in a planar-surfaced structure;

a first portion of said bore, which subsists in said plate, has a given configuration which extends uniformly fully throughout said plate; and a second portion of said bore, which subsists in said hub, is of a configuration which (a) differs from said given configuration, and (b) also extends uniformly fully throughout said hub.

2. An adapter, according to claim 1, wherein:

said holding means comprises an external, peripheral surfacing of said hub.

3. An adapter, according to claim 1, wherein:

said bore configuration in said hub has rectilinear sides.

4. An adapter, according to claim 1, wherein:

said hub has an external periphery; and said periphery is uniformly fluted.

5. An adapter, according to claim 1, wherein:

said plate has means formed therein for receiving mounting hardware.

6. An adapter, according to claim 5, wherein:

said hardware-receiving means comprises a plurality of holes formed through said plate.

7. An adapter, according to claim 1, wherein:

said plate has obverse and reverse surfaces; and said reverse surface has an annular recess formed therein.

8. An adapter, according to claim 7, wherein:

said recess extends radially, inwardly, defining a groove at an innermost end of said hub; and further including a flexible washer, for removable fastening thereof circumjacent a hub-accommodating opening in a planar-surfaced structure.

9. An adapter, for mounting a coaxial coupler within an opening formed in a planar-surfaced structure, comprising:

a body;

said body having a plate for interfacingly engaging a planar surface; and said body further having a hub (a) integral with and (b) extending perpendicularly from, said plate, for insertion thereof into an opening formed in a planar-surface structure; wherein said body has a throughgoing bore formed therein in which to nest a coaxial coupler;

said hub has means formed thereon for holding said hub fast to an inner surface of such an opening in a planar-surfaced structure; and said holding means comprises a plurality of discrete, curved lands formed on an external, peripheral surfacing of said hub.

10. An adapter, for mounting a coaxial coupler within an opening formed in a planar-surfaced structure, comprising:

a body;

said body having a plate for interfacingly engaging a planar surface; and said body further having a hub (a) integral with, and (b) extending perpendicularly from, said plate, for insertion thereof into an opening formed in a planar-surfaced structure; wherein said body has a throughgoing bore formed therein in which to nest a coaxial coupler;

said hub has means formed thereon for holding said hub fast to an inner surface of such an opening in a planar-surfaced structure; and said body further has an annular shoulder formed on an innermost portion of said plate and extending inwardly of said body from said hub.

* * * * *